United States Patent
Hoeptner, III (12)

(10) Patent No.: US 6,935,358 B1
(45) Date of Patent: *Aug. 30, 2005

(54) FLOW CONTROLLING HYDRANT STRUCTURE

(76) Inventor: Herbert W. Hoeptner, III, 7796 Oak Springs Cir., Gilroy, CA (US) 95020

( * ) Notice: Subject to any disclaimer, the term of this patent is extended or adjusted under 35 U.S.C. 154(b) by 0 days.

This patent is subject to a terminal disclaimer.

(21) Appl. No.: 10/241,086

(22) Filed: Sep. 10, 2002

Related U.S. Application Data

(60) Provisional application No. 60/326,560, filed on Oct. 1, 2001.

(51) Int. Cl.$^7$ ................................................. E03C 1/02
(52) U.S. Cl. ........................ 137/218; 137/360; 137/606
(58) Field of Search ................................ 137/218, 360, 137/606, 625.26

(56) References Cited

U.S. PATENT DOCUMENTS

| | | | |
|---|---|---|---|
| 2,569,857 A | * 10/1951 | Jaegle et al. | 137/606 |
| 3,828,815 A | 8/1974 | Botnick | |
| 4,976,279 A | 12/1990 | King, Sr. et al. | |
| 5,228,471 A | * 7/1993 | Hoeptner, III | 137/218 |
| 5,752,542 A | 5/1998 | Hoeptner, III | |
| 6,206,039 B1 | * 3/2001 | Shuler et al. | 137/606 |
| 6,386,223 B1 | 5/2002 | Hoeptner, III | |

* cited by examiner

*Primary Examiner*—Gerald A. Michalsky
(74) *Attorney, Agent, or Firm*—William W. Haefliger

(57) ABSTRACT

A dual hydrant includes two spaced apart tubular bodies to receive in-flow of fluids A and B, a fluid mixing zone to receive fluids A and B from the bodies, manually operable flow control valves in the two tubular bodies, primary and secondary check valves in the respective bodies to pass forward fluid flow toward the mixing zone, and to block reverse flow, an outlet from the mixing zone.

4 Claims, 4 Drawing Sheets

FLOW CONTROLLING HYDRANT STRUCTURE

BACKGROUND OF THE INVENTION

This application claims priority from provisional application Ser. No. 60/326,560 filed Oct. 1, 2001.

This invention relates generally to flow controlling dual hydrants, and more particularly to improvements in adjustable hot and cold water hydrants.

There is need in such hydrants or dual valves for reliably blocking or checking back flow where reverse flow pressure may build up, as in a hot and cold water mixing zone. Also, there is need in such hydrants or valves for disposing of back flow pressure that may build up in the mixing zone. Such back flow, if unchecked, could contaminate up-stream liquid such as water, in plumbing, and in particular cold water plumbing.

SUMMARY OF THE INVENTION

It is a major object of the invention to provide an improved, simple, highly effective back flow preventing hydrant of hot an cold flow type, and meeting the above needs. Basically, the assembly includes:
 a) two spaced apart tubular bodies to receive in-flow of fluids A and B,
 b) a fluid mixing zone to receive fluids A and B from said bodies,
 c) manually operable flow control valves in the two tubular bodies,
 d) primary and secondary check valves in the respective bodies to pass forward fluid flow toward said mixing zone, and to block reverse flow in one or both bodies,
 e) an outlet from said mixing zone,
 f) and an additional check valve in communication with said outlet to allow exterior air access to said outlet.

As will be seen, the mixing zone may be defined by an interconnection tube extending between said bodies, the A and B fluids being hot and cold water. A stem may be provided in each body, said primary and secondary check valves carried by the stems, the stems being manually movable endwise.

Another object is to provide an automatic draining back flow prevention apparatus connected in series with the outlet, and which comprises tubular body structure having main passage structure between flow entrance and exit ports; the flow entrance port communicating with the outlet, the body structure having side ports communicating with the passage structure; first and second diaphragms carried by the body structure to be exposed to flow in the passage structure; a stopper in the passage structure cooperating with the first diaphragm to pass forward fluid flow, and to block back flow of fluid through the main passage structure. The second diaphragm is movable to allow in-flow of air through the second side port when the stopper and first diaphragm block back flow of fluid through the main passage structure.

Yet another object is to provide two hydrant passages and a duct extending between those passages to receive hot and cold water, respectively therefrom, the duct having an outlet, primary and secondary check valves in the respective passages to block reserve flow therein, and a water drain controlling apparatus in communication with said outlet, and providing for air inlet to the interior of such apparatus, via a side passage.

In shut-off mode of the main valves, the second side port allows water drainage to prevent freezing in the structure.

Another object is to provide a stem tubular portion carrying an annular seat, a plunger carrying the check valve and extending endwise into said stem tubular portion, and an annular seal carried by the plunger to move into engagement with the seat. One of the flow control valves may be carried by the plunger.

A yet further object includes provision of an interconnection tube containing said mixing zone and intersecting said tubular body, in which said primary check valve is located, at an intersection location, said primary check valve being a traveling check valve having a range of travel which is spaced between said intersection location and the manually operable flow control valve in said tubular body in which the primary check valve is located.

Also, the additional check valve is typically located at a bore defining said outlet.

These and other objects and advantages of the invention, as well as the details of an illustrative embodiment, will be more fully understood from the following specification and drawings, in which:

DRAWING DESCRIPTION

DETAILED DESCRIPTION

Figure 1:
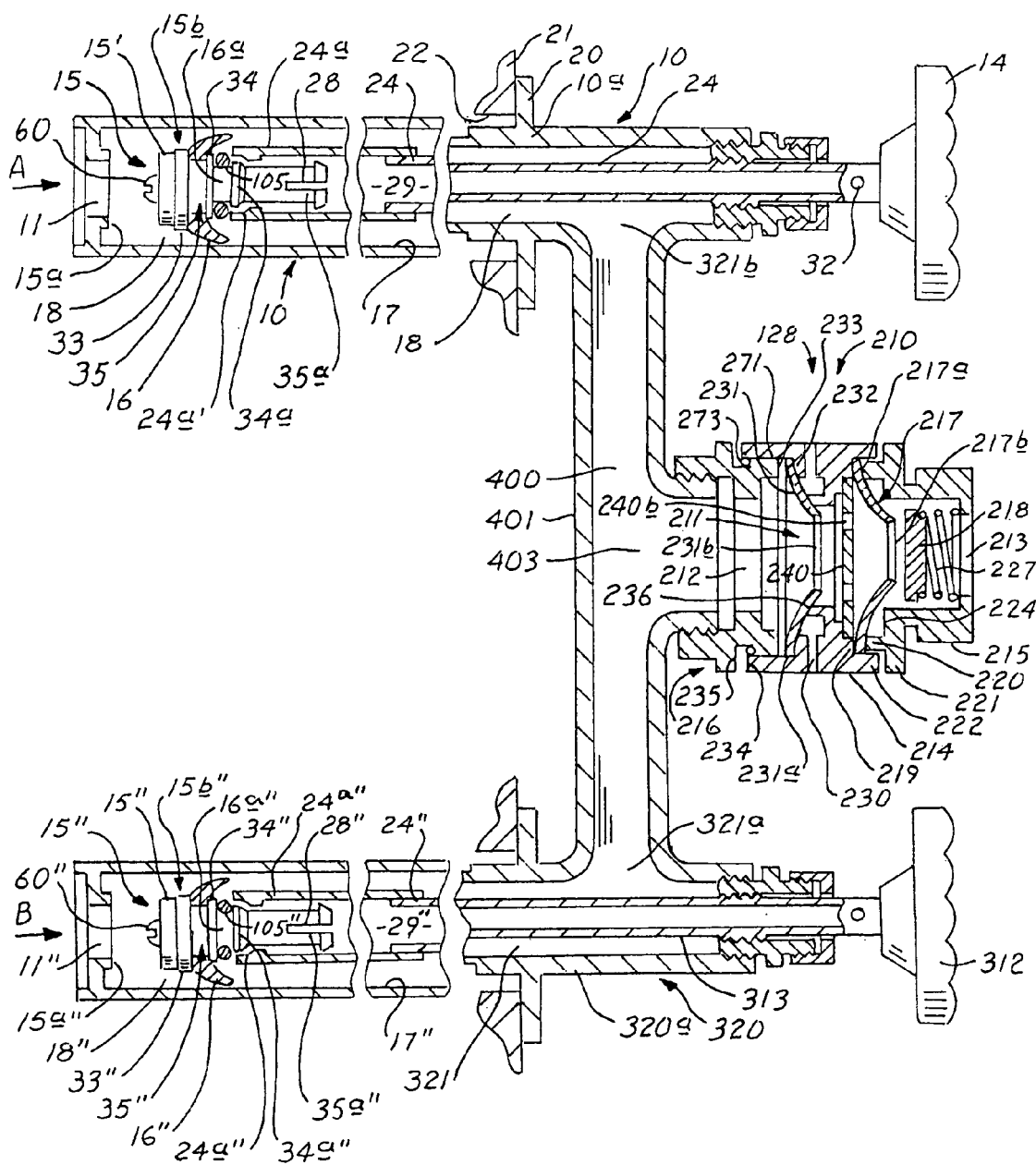
FIG. 1 is a plan view, taken in section, showing a preferred embodiment of the invention, with two flow control valves being open.

FIG. 1 shows two tubular bodies 10 and 320, which define two hydrant passages 18 and 321 for rightward flow of two liquids A and B. A mixing zone for controlled mixing of A and B is provided, and may take the form of a transverse passage 400 in a duct 401 that extends transversely between tubes 10a and 320a that also define passages 18 and 321. Duct 401 has an outlet 403 approximately mid-way along its length. As will later be described in detail, a liquid drain controlling apparatus is provided at 128, in communication with outlet 403, and is typically may provide for air inlet to the interior of apparatus 128. Liquids A and B typically comprise cold and hot water respectively.

In FIG. 1, showing an "ON" condition, an outer tubular member as at 10 has a first flow port 11 at one end of the member. A fitting at that end is adapted to receive a pipe end to which water pressure is communicated typically at about 60 PSI. Such water is typically cold water. When a control such as valve handle 14 is rotated in one direction, a closure such as a first valve stopper or plug 15 is backed away from a seat 15a in member 10, allowing pressurized liquid A such as cold water to flow past check valve 16, in bore 17, and then to flow via chamber or space 18 to duct 401, as for delivering water as from plumbing in a residence. A flange 20 on the member 10 is engageable with a wall 21 of the building, to position member 10 in a bore 22 in that wall. Check valve 16 may be considered as a first or primary check valve, or valve assembly.

The closure 15b is carried by an elongated inner member 24, and/or 24a and in its leftward advanced position, is urged against the seat 15a. In rightward retracted position, closure 15b spaced from the port 11 to open the latter, allowing rightward flow of A in passage 18.

Check valve 16 is shown as annular, to be positioned about the axis of tubular inner member 24. It is configured to deflect and to pass the flow rightwardly, as referred to above, and to block reverse fluid flow (back-flow) from space 18 leftwardly past the check valve and to and through first port 11. Thus, potentially "contaminating" back flow to 11, as from hot liquid B via passage 321 in tube 320, and via passage 400 is prevented. Hot liquid such as water can flow to passage 400 when a stopper 15" is retracted from a seat 15a", by rotation of handle 312 to retract elongated tubular stem 313. Passage 321 has a side outlet at 321a to passage 400.

A relief port may be provided, as at 32, to pass back-flow fluid from space 18, to aid in relieving build-up of pressure of fluid in that space. As shown, port 32 communicates with an axially extending slot 28 in the side wall of a tubular stem extension 35a of a body 35 that carries 16. Stem extension 35a slides telescopically in a sleeve extension 24a of tubular member 24. Port 32 leads to the exterior. Port or slot 28 is not exposed to space 18 when flow from first port 11 passes rightwardly past the check valve as in FIG. 1, i.e. port 28 is then covered, since extension 35a is then retracted rightwardly by flow pressure into sleeve extension 24a on 24. However, if backpressure builds up in space 18, check valve 16 is then pushed to the left, uncovering the port 28, to allow escape or relief of backpressure.

Note in this regard the positioning of the check valve inner annular body 16a between two flanges 33 and 34 on axially movable body 35 that carries stopper 15 at the leftward end of body 35. Body 35 carries on O-ring 105 between flange 34 and flange 34a, to seat at tapered seat end 24a' of extension 24a, as in FIG. 1, thereby isolating slot 28 from passage 18. Pressurized drain flow cannot escape via slit port 28 to the bore 29 of member 24 and to outlet 32. However, when back-flow pressure dominates, it forces valve 16 to the left, carrying body 35 to the left, and slit port 28 then becomes exposed to passage 18, due to travel of O-ring 105 leftwardly away from the tapered seat end of sleeve 24a. Back flow pressure can then be relieved via slit port 28 and bore 29 to the exterior via outlet 32.

Figure 2:
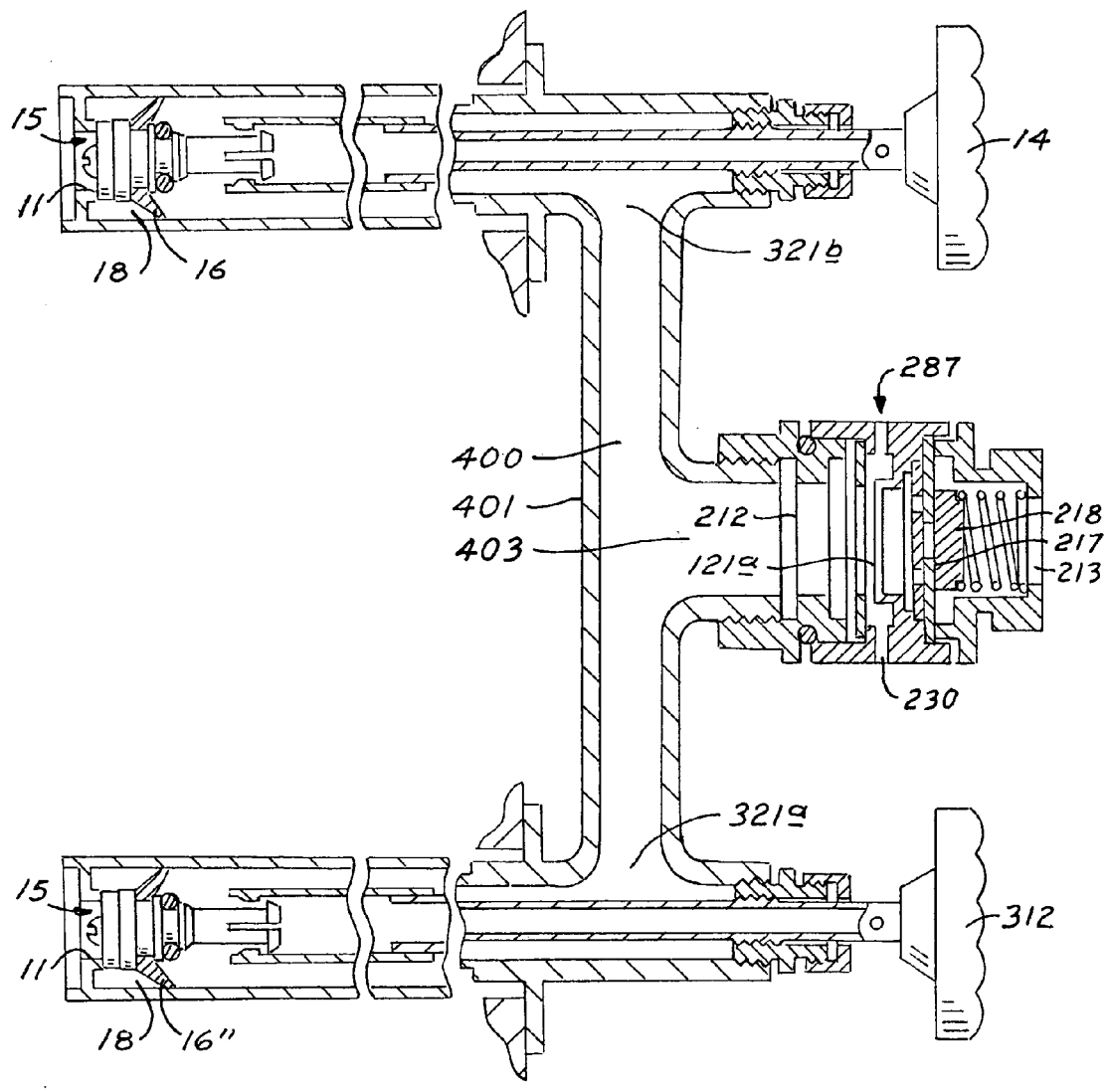
FIG. 2 is a view like FIG. 1, but with the two check valves in closed position.

Note that check valve 16 has a frusto-conical annular lip on 16 wiping against bore 17, when moved to FIG. 2 position. No spring is required to move valve 16 leftwardly.

A fastener 60 is shown extending axially to retain a stopper 15 plate 15' to flange 33 of assembly 15b, allowing its replacement.

Elements like those described above are also provided in leftward extent of duct or body 320, and bear the same numbers, but with double primes. Flow B may be hot water, and Flow A may be cold water. Check valve 16" is a secondary check valve.

Also provided is the highly advantageous form of additional check valve or valve assembly as at 128 referred to above. In FIG. 1, tubular body means 210 has main through passage structure 211 between entrance and exit ports 212 and 213. The direction of forward fluid flow is toward 213. By way of example, the tubular body means may advantageously comprise a first tubular section 214, a second tubular section 215 and a third tubular section 216; and such sections may be axially assembled in telescoping relation, as in the manner shown. The flow sequence is from 216 and 214 to 215.

A first flexible diaphragm 217 is carried by the body means 214 and 215 to be exposed to flow in the passage means 212. Also, a stopper 218 is provided in the passage means to cooperate with the first diaphragm to pass forward fluid flow while the first diaphragm flexes forwardly, as seen in FIG. 1 showing the ON condition. As shown, the first diaphragm is annular and may have its outer annular extent 217a retained between annular shoulder 219 formed by the first body section 214 and annular shoulder 220 formed by the second section 215. Flange 221 on the second section engages a rim 222 on the first section to limit closing of shoulder 220 toward shoulder 219 when the diaphragm is forcibly retained between its shoulders. Threads may interconnect 214 and 215.

Note that the second body section 215 has an annular seat 224 thereon presented toward the diaphragm and positioned to annularly seat the first diaphragm as it flexes. Under these conditions, flow passes through the diaphragm central opening 217b, then around the periphery of the stopper 218 and then outwardly through the exit port 213. Flow pressure against the stopper displaces it to allow such flow to pass through central opening 217b in diaphragm 217, a compression spring 227 in the second section 215 exerting return force on the stopper. That spring is compressed as the stopper is forced to FIG. 1 position by flow pressure.

The body means also has a second side port or ports 230 for communicating with the interior passage structure 211. Under these conditions, the port or ports 230 act to pass fluid out of passage 211, second diaphragm 231 flexing away from annular seat 236 to allow such out-flow. The second diaphragm is seated on seat 236, to block exit flow through the second side port or ports 230 in response to the described flow of fluid through the main passage means, this condition being shown in FIG. 1. Note that the second diaphragm outer annular extent 231a may be captivated between opposed shoulders 232 on the first body section and 233 on the third body section in such manner as to allow the described flexing or movement of the second diaphragm. Interengaged shoulders 234 and 235 of the sections 214 and 216 limit closure of shoulders 232 and 233 to captivate the second diaphragm. Threading at 271 removably connects 214 and 216. See also annular seal 273.

The stopper 218 cooperates with the first diaphragm 217 to block back flow of fluid through the main passage when the first diaphragm moves to block and hold back flow or back pressure of fluid. In this regard, a metallic disc 240 or equivalent support is provided in the body means to extend normal to the flow, and the support the first diaphragm 217. The spring 227 then urges the stopper 218 to engage the side of the diaphragm 217, closing or blanking its central opening 217b, and thereby forcing the diaphragm against the disc 240. The central portion of the disc then extends across the diaphragm central opening 217b to block the escape of fluid through that opening and the diaphragm blanks escape through disc opening or openings 240b. when the diaphragm is displaced, flow passes through disc opening or openings 240b spaced radially outwardly of, or about, the disc central portion. Note also that the second annular diaphragm has a central opening 231b to pass such flow, in FIG. 1 and to pass air.

In FIG. 1, the second diaphragm 231 is shown as having moved off the seat 236.

The two diaphragms are spaced apart lengthwise of the passage so that they may flex independently. Each of the diaphragms is annular and has its outer periphery retained in position relative to the body, the latter having disconnectible sections to provide ready access to the diaphragms for removal and replacement. In this regard, while the sections may have threaded interconnections, other forms of connection may be provided. Also, the stopper is movable in the passage free of both of said diaphragms, and in spaced relation thereto.

Forward flow of fluid is allowed without sideward discharge. In the event of attempted back flow, the FIG. 2 configuration is assumed (stopper 218 engaging diaphragm 217) and back flow is held. This is in addition to the action of the first check valve 16 to block reverse flow, whereby a redundant provision against back flow to the water mains via 10 is provided. The positions of the elements at rest when there is no forward flow are shown in FIG. 2. A drainage path is provided by outlet 230.

FIG. 2 shows the positions of the elements, as during a back-siphonage condition. For example, supply pressure may go to zero. The intermediate chamber shown at 121*a* in FIG. 2 then sucks air in (see arrow 287) via port 230, as for example if either the primary or secondary valves 16 or 16" fails. Stopper 218 holds against 217 to close off back flow from 213 to 212 and to 121*a*.

Accordingly, a multi-functional cold and/or hot water (or mixture) drain controlling dual diaphragm apparatus is provided, in communication with the common outlet (for both A and B), and provision is also made for air inlet to the interior of the apparatus, via a side passage, and back siphonage to either or both of the hydrant passages 18 and 321 is also blocked.

Outlet 230 also provides for water drainage when the hydrant is shown as in FIG. 2 configuration. Freezing is also prevented when the hydrant is OFF. The FIG. 2 closed condition of the check valve 16 stops contaminated inflow of water from a downstream hose. Closure of check valve 16 prevents hot water flow from mixing zone 400 to the cold side of the check valve 16; and slide shut condition of the piston 35*a* then occurs.

It will thus be seen that the dual hydrant has a protective back siphonage configuration in which said primary and secondary check valves are closed and said stopper blocks backflow of fluid through the warm passage structure to the mixing zone, and accompanied by reduced fluid pressure conditions in said mixing zone, and further accompanied by an open condition of said second diaphragm to allow drainage of the mixing zone to external atmosphere.

It will be noted that check valve 16 is a traveling check valve having a range of travel in the space between tube intersection location 321*b* and the manually operable flow valve 15 in tubular body 10 in which valve 16 is located.

Figure 3:
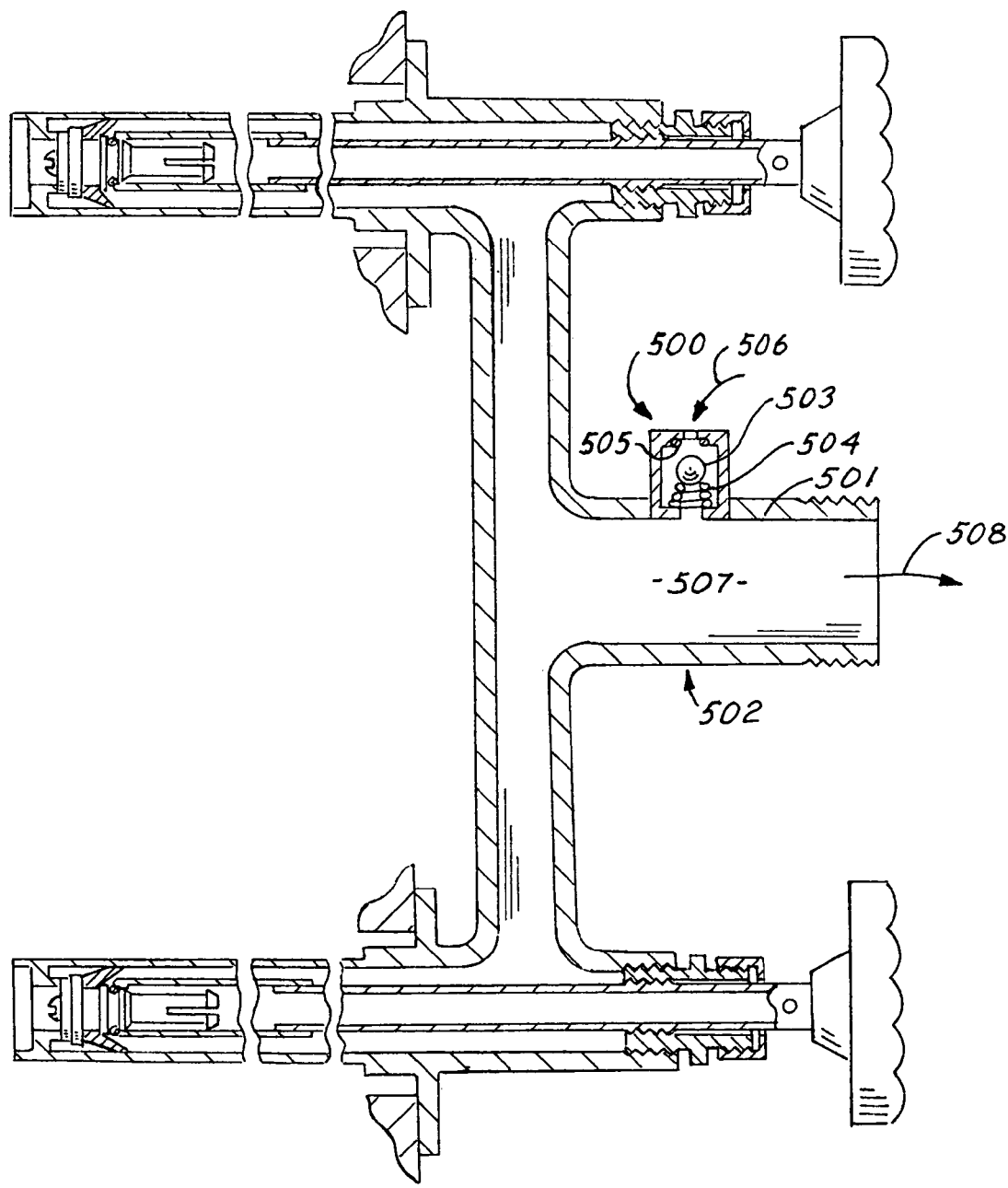
FIGS. 3 and 4 are like FIGS. 1 and 2 but show ON and OFF valve position, and an auxiliary check valve at the side of an outlet.
Figure 4:
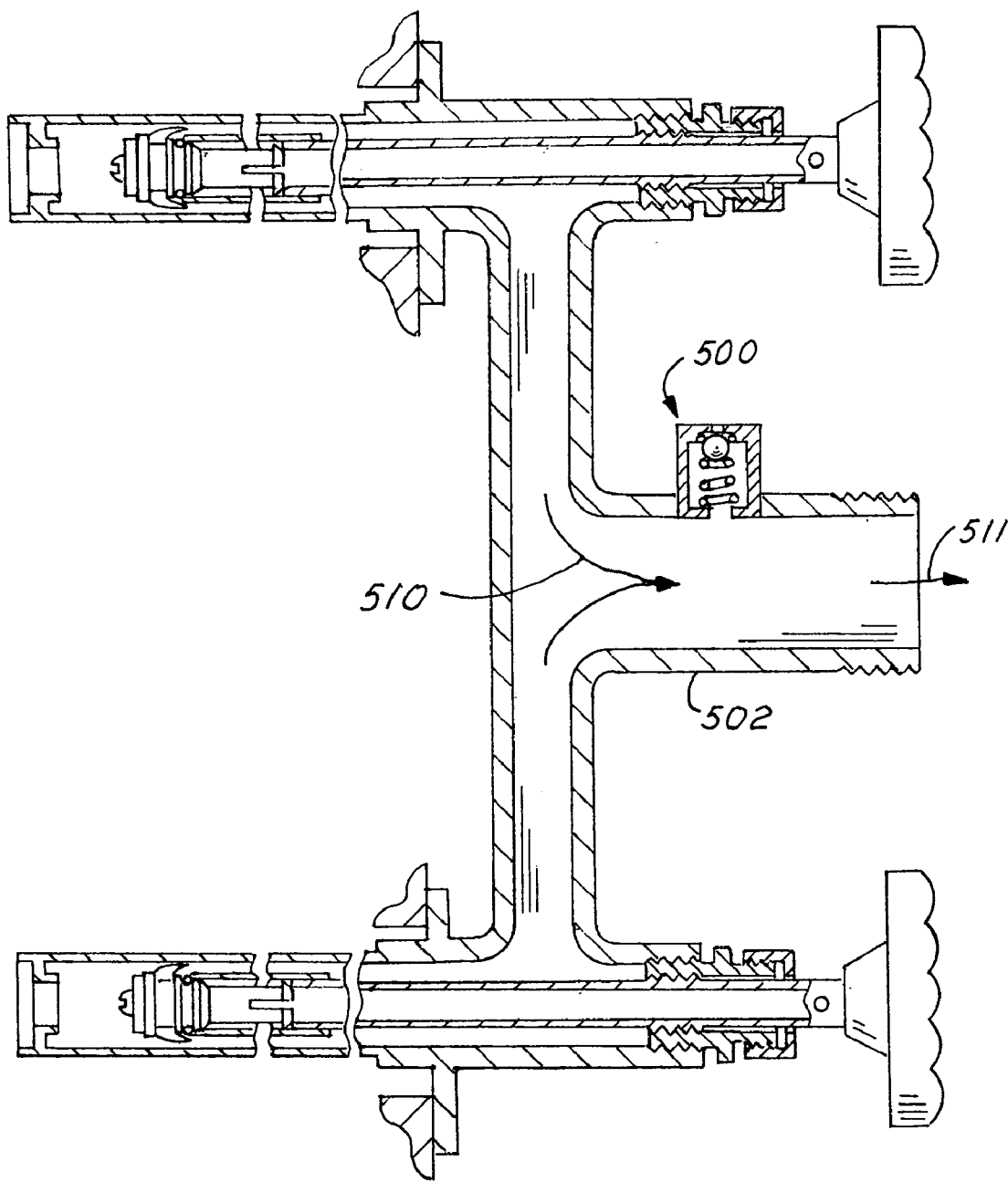

In FIGS. 3 and 4, an additional check valve unit 500 is located at a bore or side wall portion 501 of outlet duct 502. Note ball 503 urged by spring 504 toward or against seat 505. In the valve OFF condition of FIG. 3, air enters at 506, due to suction condition at 507, permitting water to drain at 508, preventing freezing. In the valve ON condition of FIG. 4, the check valve unit 500 is closed, and A and B flows are delivered to and through 502, as indicated by arrows 510 and 511.

I claim:

1. In a dual hydrant, the combination comprising
  a) two spaced apart tubular bodies to receive in-flow of fluids A and B,
  b) a fluid mixing zone to receive fluids A and B from said bodies,
  c) manually operable flow control valves in the two tubular bodies,
  d) primary and secondary check valves in the respective bodies to pass forward fluid flow toward said mixing zone, and to block reverse flow in one or both bodies, there being sliding plungers carrying said check valves,
  e) and a main outlet from said mixing zone,
  f) and a side check valve proximate said outlet to block sideward flow from said outlet, and to allow air entry sidewardly into said outlet, whereby when said primary and secondary check valves are closed, said main outlet is blocked by an outlet check valve to hold pressure in an outlet hose, and pressure in the mixing zone is reduced, said side check valve is opened,
  g) there being no side outlet ports controlled by said outlet check valve,
  h) said mixing zone being defined by an interconnection tube extending between said bodies, said A and B fluids being hot and cold water, there being tubular stems carrying said primary and secondary check valves, and back pressure drain ports in said tubular stems remote from said mixing zone, and in communication with said mixing zone, each said port being opened by sliding of its associated plunger.

2. The combination of claim 1 wherein each stem has a tubular portion, an annular seat on said stem tubular portion, the slidable plunger carrying said check valve extending endwise into said stem tubular portion, and an annular seal carried by the plunger to move into engagement with the seat.

3. The combination of claim 1 including flow control valves carried by the plungers.

4. The combination of claim 1 wherein said interconnection tube intersects said tubular body, at an intersection location, wherein said primary check valve being is a traveling check valve having a range of travel which is spaced between said intersection location and the manually operable flow control valve in said tubular body in which the primary check valve is located.

* * * * *